(12) United States Patent
Kook et al.

(10) Patent No.: US 10,393,233 B2
(45) Date of Patent: *Aug. 27, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jae Chang Kook, Hwaseong-si (KR); Hyun Sik Kwon, Seoul (KR); Ki Tae Kim, Incheon (KR); Wonmin Cho, Hwaseong-si (KR); Seong Wook Hwang, Gunpo-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 175 days.

This patent is subject to a terminal disclaimer.

(21) Appl. No.: 15/657,862

(22) Filed: Jul. 24, 2017

(65) Prior Publication Data
US 2018/0163823 A1    Jun. 14, 2018

(30) Foreign Application Priority Data
Dec. 12, 2016 (KR) .................. 10-2016-0168799

(51) Int. Cl.
*F16H 3/62* (2006.01)
*F16H 37/06* (2006.01)
*F16H 3/44* (2006.01)
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ................. F16H 2200/2012; F16H 2200/2046
See application file for complete search history.

(56) References Cited

U.S. PATENT DOCUMENTS

| | | | | |
|---|---|---|---|---|
| 9,726,262 | B1 * | 8/2017 | Kook | F16H 3/66 |
| 2015/0369342 | A1 * | 12/2015 | Kato | F16H 3/66 475/275 |
| 2016/0356351 | A1 * | 12/2016 | Lee | F16H 3/66 |
| 2016/0356352 | A1 * | 12/2016 | Kook | F16H 3/66 |
| 2017/0268607 | A1 * | 9/2017 | Kwon | F16H 3/66 |
| 2017/0268620 | A1 * | 9/2017 | Ji | F16H 3/66 |

* cited by examiner

*Primary Examiner* — Tisha D Lewis
(74) *Attorney, Agent, or Firm* — Brinks Gilson & Lione

(57) ABSTRACT

Ten or more forward speeds and one or more reverse speed are achieved by a planetary gear train of an automatic transmission including four planetary gear sets. In particular, an input shaft is connected with fourth and seventh rotational elements, an output shaft is connected with a twelfth rotational element, second and fifth rotational elements are fixedly interconnected, third and eighth rotational elements are interconnected, and ninth and eleventh rotational elements are interconnected, the second, fourth, and tenth rotational elements are selectively interconnected, and eighth and twelfth rotational elements are selectively interconnected.

8 Claims, 2 Drawing Sheets

FIG. 2

Figure 1:
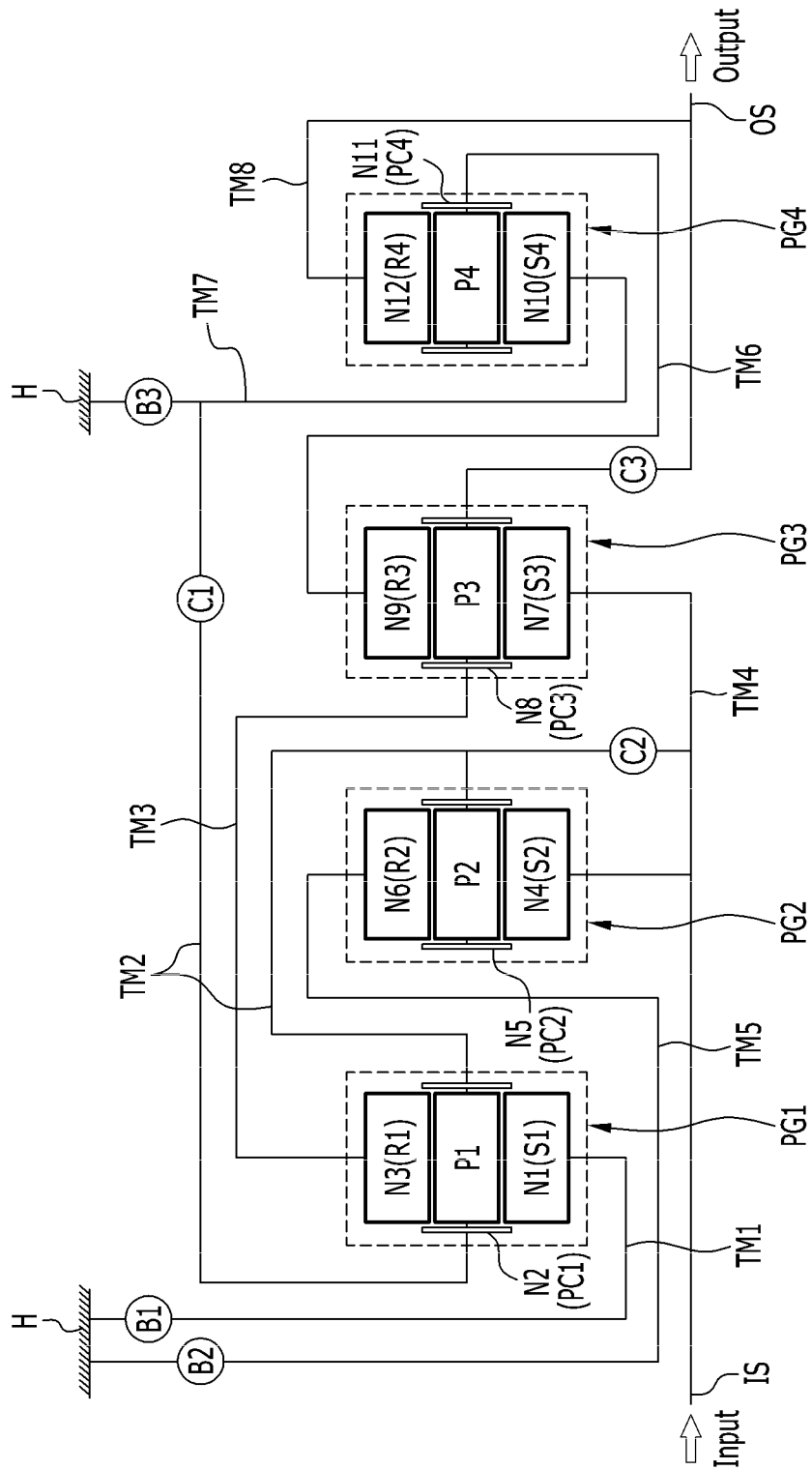

| Shift-stage | Control element | | | | | | Gear ratio |
|---|---|---|---|---|---|---|---|
| | C1 | C2 | C3 | B1 | B2 | B3 | |
| D1 | ● | | | ● | ● | | 5.641 |
| D2 | | | | ● | ● | ● | 3.593 |
| D3 | | | ● | ● | ● | | 2.627 |
| D4 | | | ● | | ● | ● | 1.900 |
| D5 | ● | | ● | | ● | | 1.493 |
| D6 | ● | | ● | ● | | | 1.184 |
| D7 | ● | ● | ● | | | | 1.000 |
| D8 | | ● | ● | ● | | | 0.796 |
| D9 | ● | ● | | ● | | | 0.696 |
| D10 | | ● | | ● | | ● | 0.565 |
| R1 | ● | | | ● | | ● | -2.700 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0168799, filed Dec. 12, 2016, which is incorporated herein by reference in its entirety.

FIELD

The present disclosure relates to a planetary gear train of an automatic transmission for a vehicle.

BACKGROUND

The statements in this section merely provide background information related to the present disclosure and may not constitute prior art.

In the field of an automatic transmission, more multiplicity of shift-stages is useful technology for enhancement of fuel consumption and drivability of a vehicle. Recently, increase of oil price is triggering a hard competition to enhance fuel efficiency of a vehicle.

In this sense, research for an engine has been made to achieve weight reduction and to enhance fuel efficiency by so-called downsizing, and an automatic transmission has been developed to simultaneously provide better drivability and to improve fuel efficiency by achieving more shift stages.

In order to achieve more shift-stages for an automatic transmission, the number of parts is typically increased, which may deteriorate installability, production cost, weight and/or power flow efficiency.

Therefore, in order to maximally enhance fuel consumption of an automatic transmission having more shift-stages, it is important that better efficiency is derived with less number of parts.

In this background, an eight-speed automatic transmission has been introduced recently and a planetary gear train for an automatic transmission enabling more shift-stages has been developed.

An automatic transmission of eight or more shift-stages typically includes three to four planetary gear sets and five to seven control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of obtaining shift-stages of ten forward speeds and one reverse speed by reduced number of parts, improving power delivery performance and fuel efficiency by multi-stages of an automatic transmission, and improving driving stability of a vehicle by utilizing a low rotation speed of an engine.

A planetary gear train according to an exemplary form of the present disclosure includes: an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; and a fourth planetary gear set having tenth, eleventh, and twelfth rotational elements.

In more detail, a first shaft may be fixedly connected with the first rotational element, and a second shaft may be fixedly connected with the second rotational element and the fifth rotational element. A third shaft may be fixedly connected with the third rotational element and the eighth rotational element, and a fourth shaft may be fixedly connected with the fourth rotational element, the input shaft and the seventh rotational element, and further selectively connected with the second shaft. A fifth shaft may be fixedly connected with the sixth rotational element, a sixth shaft may be fixedly connected with the ninth rotational element and the eleventh rotational element, a seventh shaft may be fixedly connected with the tenth rotational element and selectively connected with the second shaft, and an eighth shaft may be fixedly connected with the twelfth rotational element and the output shaft, and further selectively connected with the third shaft.

The first shaft, the fifth shaft, and the seventh shaft may be selectively connected with a transmission housing, respectively.

The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

The exemplary planetary gear train may further include a first clutch configured to selectively connect the second shaft and the seventh shaft, a second clutch configured to selectively connect the second shaft and the fourth shaft, a third clutch configured to selectively connect the third shaft and the eighth shaft, a first brake configured to selectively connect the first shaft and the transmission housing, a second brake configured to selectively connect the fifth shaft and the transmission housing, and a third brake configured to selectively connect the seventh shaft and the transmission housing.

A planetary gear train according to an exemplary form of the present disclosure may realize at least ten forward speeds and at least one reverse speed by operating the four planetary gear sets of simple planetary gear sets by controlling six control elements.

In addition, a planetary gear train according to an exemplary form of the present disclosure may substantially improve driving stability by realizing shift-stages appropriate for rotation speed of an engine due to multi-stages of an automatic transmission.

In addition, a planetary gear train according to an exemplary form of the present disclosure increases engine driving efficiency by multi-stages of an automatic transmission, and may improve power delivery performance and fuel efficiency.

Further, effects that can be obtained or expected from exemplary forms of the present disclosure are fixedly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train according to an exemplary form of the present disclosure; and FIG. 2 is an operational chart for respective control elements at respective shift-stages in a planetary gear train according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second and the like is to divide the names because the names of the components are the same as each other and an order thereof is not particularly limited. As used herein, "fixedly connected" includes a direct connection of two parts for rotation together.

FIG. 1 is a schematic diagram of a planetary gear train according to an exemplary form of the present disclosure.

Referring to FIG. 1, a planetary gear train includes: first, second, third, and fourth planetary gear sets PG1, PG2, PG3, and PG4 arranged on a same axis; an input shaft IS; an output shaft OS; eight shafts TM1 to TM8 connected with rotational elements of the first, second, third, and fourth planetary gear sets PG1, PG2, PG3, and PG4; control elements of three clutches C1 to C3 and one brake B1; and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus (not shown).

The first planetary gear set PG1 is a single pinion planetary gear set, and includes a first sun gear S1, a first planet carrier PC1 that rotatably supports a plurality of first pinion gears P1 externally gear-meshed with the first sun gear S1, and a first ring gear R1 that is internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that rotatably supports a plurality of second pinion gears P2 externally gear-meshed with the second sun gear S2, and a second ring gear R2 that is internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that rotatably supports a plurality of third pinion gears P3 externally gear-meshed with the third sun gear S3, and a third ring gear R3 that is internally gear-meshed with the plurality of third pinion gears P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that rotatably supports a plurality of fourth pinion gears P4 externally gear-meshed with the fourth sun gear S4, and a fourth ring gear R4 that is internally gear-meshed with the plurality of fourth pinion gears P4. The fourth sun gear S4 acts as a tenth rotational element N10, the fourth planet carrier PC4 acts as an eleventh rotational element N11, and the fourth ring gear R4 acts as a twelfth rotational element N12

In the arrangement of the first, second, third, and fourth planetary gear sets PG1, PG2, PG3, and PG4, the second rotational element N2 and the fifth rotational element N5 are directly interconnected, the third rotational element N3 and the eighth rotational element N8 are fixedly interconnected, the fourth rotational element N4 and the seventh rotational element N7 are fixedly interconnected, and the ninth rotational element N9 and the eleventh rotational element N11 are fixedly interconnected, by eight shafts TM1 to TM8.

The eight shafts TM1 to TM8 are arranged as follows.

Each of the eight shafts TM1 to TM8 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

The first shaft TM1 is fixedly connected with the first rotational element N1 (first sun gear S1), and selectively connected with the transmission housing H, thereby selectively acting as a fixed element.

The second shaft TM2 is fixedly connected with the second rotational element N2 (first planet carrier PC1) and the fifth rotational element N5 (second planet carrier PC2).

The third shaft TM3 is fixedly connected with the third rotational element N3 (first ring gear R1) and the eighth rotational element N8 (third planet carrier PC3).

The fourth shaft TM4 is fixedly connected with the fourth rotational element N4 (second sun gear S2) and the seventh rotational element N7 (third sun gear S3), selectively connected with the second shaft TM2, and fixedly connected with the input shaft IS, thereby always acting as an input element.

The fifth shaft TM5 is fixedly connected with the sixth rotational element N6 (second ring gear R2), and selectively connected with the transmission housing H, thereby selectively acting as a fixed element.

The sixth shaft TM6 is fixedly connected with the ninth rotational element N9 (third ring gear R3) and the eleventh rotational element N11 (fourth planet carrier PC4).

The seventh shaft TM7 is fixedly connected with the tenth rotational element N10 (fourth sun gear S4), selectively connected with the second shaft TM2, and selectively connected with the transmission housing H, thereby selectively acting as a fixed element.

The eighth shaft TM8 is fixedly connected with the twelfth rotational element N12 (fourth ring gear R4), selectively connected with the third shaft TM3, and fixedly connected with the output shaft OS, thereby always acting as an output element.

The eight shafts TM1 to TM8, the input shaft IS, and the output shaft OS may be selectively interconnected with one another by control elements of three clutches C1, C2, and C3.

The eight shafts TM1 to TM8 may be selectively connected with the transmission housing H, by control elements of three brakes B1, B2, and B3.

The three clutches C1 to C3 and the three brakes B1 to B3 are arranged as follows.

The first clutch C1 is arranged between the second shaft TM2 and the seventh shaft TM7, and selectively connects the second shaft TM2 and the seventh shaft TM7, thereby controlling power delivery therebetween.

The second clutch C2 is arranged between the second shaft TM2 and the fourth shaft TM4, and selectively connects the second shaft TM2 and the fourth shaft TM4, thereby controlling power delivery therebetween.

The third clutch C3 is arranged between the third shaft TM3 and the eighth shaft TM8, and selectively connects the third shaft TM3 and the eighth shaft TM8, thereby controlling power delivery therebetween.

The first brake B1 is arranged between the first shaft TM1 and the transmission housing H, and selectively connects the first shaft TM1 to the transmission housing H.

The second brake B2 is arranged between the fifth shaft TM5 and the transmission housing H, and selectively connects the fifth shaft TM5 to the transmission housing H.

The third brake B3 is arranged between the seventh shaft TM7 and the transmission housing H, and selectively connects the seventh shaft TM7 to the transmission housing H.

The control elements of the first, second, and third clutch C1, C2, and C3 and the first, second, third brake B1, B2, and B3 may be realized as multi-plate hydraulic pressure friction devices that are frictionally engaged by hydraulic pressure.

FIG. 2 is an operational chart for respective control elements at respective shift-stages in a planetary gear train according to an exemplary form of the present disclosure.

Referring to FIG. 2, a planetary gear train according to an exemplary form of the present disclosure realizes ten forward speeds and one reverse speed by operating three control elements among the first, second, and third clutches C1, C2, and C3 and the first, second, and third brakes B1, B2, and B3 at respective shift-stages.

In the forward first speed D1, the first clutch C1 and the first and second brakes B1 and B2 are simultaneously operated.

As a result, the second shaft TM2 is interconnected with the seventh shaft TM7 by the operation of the first clutch C1. In this state, the torque of the input shaft IS is input to the fourth shaft TM4.

In addition, the first shaft TM1 and the fifth shaft TM5 act as fixed elements by the operation of the first and second brakes B1 and B2, thereby realizing the forward first speed by cooperative operation of respective shafts and outputting a shifted torque to the output shaft OS connected with the eighth shaft TM8.

In the forward second speed D2, the first and second, third brakes B1, B2, and B3 are simultaneously operated.

As a result, torque of the input shaft IS is input to the fourth shaft TM4.

In addition, the first shaft TM1, fifth shaft TM5, seventh shaft TM7 act as fixed elements by the operation of the first, second, third brake B1, B2, and B3, thereby realizing the forward second speed by cooperative operation of respective shafts and outputting a shifted torque to the output shaft OS connected with the eighth shaft TM8.

In the forward third speed D3, the third clutch C3 and the first and second brakes B1 and B2 are simultaneously operated.

As a result, the third shaft TM3 is interconnected with the eighth shaft TM8 by the operation of the third clutch C3. In this state, the torque of the input shaft IS is input to the fourth shaft TM4.

In addition, the first shaft TM1 and the fifth shaft TM5 act as fixed elements by the operation of the first and second brakes B1 and B2, thereby realizing the forward third speed by cooperative operation of respective shafts and outputting a shifted torque to the output shaft OS connected with the eighth shaft TM8.

In the forward fourth speed D4, the third clutch C3 and the second and third brakes B2 and B3 are simultaneously operated.

As a result, the third shaft TM3 is interconnected with the eighth shaft TM8 by the operation of the third clutch C3. In this state, the torque of the input shaft IS is input to the fourth shaft TM4.

In addition, the fifth shaft TM5 and seventh shaft TM7 act as fixed elements by the operation of the second, third brakes B2 and B3, thereby realizing the forward fourth speed by cooperative operation of respective shafts and outputting a shifted torque to the output shaft OS connected with the eighth shaft TM8.

In the forward fifth speed D5, the first and third clutches C1 and C3 and the second brake B2 are simultaneously operated.

As a result, the second shaft TM2 is interconnected with the seventh shaft TM7 by the operation of the first clutch C1, and the third shaft TM3 is interconnected with the eighth shaft TM8 by the operation of the third clutch C3. In this state, the torque of the input shaft IS is input to the fourth shaft TM4.

In addition, the fifth shaft TM5 acts as a fixed element by the operation of the second brake B2, thereby realizing the forward fifth speed by cooperative operation of respective shafts and outputting a shifted torque to the output shaft OS connected with the eighth shaft TM8.

In the forward sixth speed D6, the first and third clutches C1 and C3 and the first brake B1 are simultaneously operated.

As a result, the second shaft TM2 is interconnected with the seventh shaft TM7 by the operation of the first clutch C1, and the third shaft TM3 is interconnected with the eighth shaft TM8 by the operation of the third clutch C3. In this state, the torque of the input shaft IS is input to the fourth shaft TM4.

In addition, the first shaft TM1 acts as a fixed element by the operation of the first brake B1, thereby realizing the forward sixth speed by cooperative operation of respective shafts and outputting a shifted torque to the output shaft OS connected with the eighth shaft TM8.

In the forward seventh speed D7, the first, second, and third clutches C1, C2, and C3 are simultaneously operated.

As a result, the second shaft TM2 is interconnected with the seventh shaft TM7 by the operation of the first clutch C1, the second shaft TM2 is interconnected with the fourth shaft TM4 by the operation of the second clutch C2, and the third shaft TM3 is interconnected with the eighth shaft TM8 by the operation of the third clutch C3. In this state, the torque of the input shaft IS is input to the fourth shaft TM4 and the second shaft TM2.

In this case, the first, second, third, and fourth planetary gear sets PG1, PG2, PG3, and PG4 integrally rotate. Thereby, a torque inputted through the input shaft IS is outputted as inputted, thereby forming the forward seventh speed and outputting a shifted torque to the output shaft OS connected with the eighth shaft TM8.

In the forward eighth speed D8, the second and third clutches C2 and C3 and the first brake B1 are simultaneously operated.

As a result, the second shaft TM2 is interconnected with the fourth shaft TM4 by the operation of the second clutch C2, and the third shaft TM3 is interconnected with the eighth shaft TM8 by the operation of the third clutch C3. In this state, the torque of the input shaft IS is input to the fourth shaft TM4 and the second shaft TM2.

In addition, the first shaft TM1 acts as a fixed element by the operation of the first brake B1, thereby realizing the forward eighth speed by cooperative operation of respective shafts and outputting a shifted torque to the output shaft OS connected with the eighth shaft TM8.

In the forward ninth speed D9, the first and second clutch C1 and C2 and the first brake B1 are simultaneously operated.

As a result, the second shaft TM2 is interconnected with the seventh shaft TM7 by the operation of the first clutch C1, and the second shaft TM2 is interconnected with the fourth shaft TM4 by the operation of the second clutch C2. In this state, the torque of the input shaft IS is input to the fourth shaft TM4 and the second shaft TM2.

In addition, the first shaft TM1 acts as a fixed element by the operation of the first brake B1, thereby realizing the forward ninth speed by cooperative operation of respective shafts and outputting a shifted torque to the output shaft OS connected with the eighth shaft TM8.

In the forward tenth speed D10, the second clutch C2 and the first and third brakes B1 and B3 are simultaneously operated.

As a result, the second shaft TM2 is interconnected with the fourth shaft TM4 by the operation of the second clutch C2. In this state, the torque of the input shaft IS is input to the fourth shaft TM4 and the second shaft TM2.

In addition, the first shaft TM1 and seventh shaft TM7 act as fixed elements by the operation of the first and third brakes B1 and B3, thereby realizing the forward tenth speed by cooperative operation of respective shafts and outputting a shifted torque to the output shaft OS connected with the eighth shaft TM8.

In the reverse speed REV, the first clutch C1 and the first and third brakes B1 and B3 are simultaneously operated.

As a result, the second shaft TM2 is interconnected with the seventh shaft TM7 by the operation of the first clutch C1. In this state, the torque of the input shaft IS is input to the fourth shaft TM4.

In addition, the first shaft TM1 and the seventh shaft TM7 act as fixed elements by the operation of the first and third brakes B1 and B3, thereby realizing the reverse speed by cooperative operation of respective shafts and outputting a shifted reverse torque to the OS connected with the eighth shaft TM8.

As described above, a planetary gear train according to an exemplary form of the present disclosure may realize the forward tenth speed and one reverse speed by operating four planetary gear set PG1, PG2, PG3, and PG4 by controlling the three clutches C1, C2, and C3 and the three brakes B1, B2, and B3.

In addition, a planetary gear train according to an exemplary form of the present disclosure may realize shift stages appropriate for rotation speed of an engine due to multi-stages of an automatic transmission and improve driving stability of a vehicle by utilizing a low rotation speed of an engine.

In addition, a planetary gear train according to an exemplary form of the present disclosure increases engine driving efficiency by multi-stages of an automatic transmission, and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2, B3: first, second, and third brakes
C1, C2, C3: first, second, and third clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shafts

What is claimed is:
1. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements;

a fourth planetary gear set having tenth, eleventh, and twelfth rotational elements;
a first shaft fixedly connected with the first rotational element;
a second shaft fixedly connected with the second rotational element and the fifth rotational element;
a third shaft fixedly connected with the third rotational element and the eighth rotational element;
a fourth shaft fixedly connected with the fourth rotational element, the input shaft and the seventh rotational element, and configured to be selectively connected with the second shaft;
a fifth shaft fixedly connected with the sixth rotational element;
a sixth shaft fixedly connected with the ninth rotational element and the eleventh rotational element;
a seventh shaft fixedly connected with the tenth rotational element and selectively connected with the second shaft; and
an eighth shaft fixedly connected with the twelfth rotational element and the output shaft, and configured to be selectively connected with the third shaft.

2. The planetary gear train of claim 1, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

3. The planetary gear train of claim 1, wherein the first shaft, the fifth shaft, and the seventh shaft are selectively connected with a transmission housing, respectively.

4. The planetary gear train of claim 3, further comprising:
a first clutch configured to selectively connect the second shaft and the seventh shaft;
a second clutch configured to selectively connect the second shaft and the fourth shaft;
a third clutch configured to selectively connect the third shaft and the eighth shaft;
a first brake configured to selectively connect the first shaft and the transmission housing;
a second brake configured to selectively connect the fifth shaft and the transmission housing; and
a third brake configured to selectively connect the seventh shaft and the transmission housing.

5. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is fixedly connected with the fourth rotational element and the seventh rotational element,
the output shaft is fixedly connected with the twelfth rotational element,
the second rotational element is connected with the fifth rotational element,
the third rotational element is connected with the eighth rotational element,
the ninth rotational element is connected with the eleventh rotational element,
the second rotational element is selectively connected with the fourth and tenth rotational elements respectively, and
the eighth rotational element is selectively connected with the twelfth rotational element.

6. The planetary gear train of claim 5, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set;
the tenth, eleventh, and twelfth rotational elements of the fourth planetary gear set are respectively a fourth sun gear, a fourth planet carrier, and a fourth ring gear of the fourth planetary gear set.

7. The planetary gear train of claim 5, wherein the first, sixth, and tenth rotational elements are selectively connected with a transmission housing.

8. The planetary gear train of claim 7, further comprising:
a first clutch configured to selectively connect the second rotational element and the tenth rotational element;
a second clutch configured to selectively connect the fourth rotational element and the fifth rotational element;
a third clutch configured to selectively connect the eighth rotational element and the twelfth rotational element;
a first brake configured to selectively connect the first rotational element and the transmission housing;
a third brake configured to selectively connect the sixth rotational element and the transmission housing; and
a third brake configured to selectively connect the tenth rotational element and the transmission housing.

* * * * *